United States Patent [19]

Bolton et al.

[11] 4,119,114

[45] Oct. 10, 1978

[54] FLUID TRANSFER APPARATUS

[75] Inventors: Jack Curtis Bolton, Salinas; Franklin Leroy Alexander, Hollister, both of Calif.

[73] Assignee: Union Carbide Corporation, New York, N.Y.

[21] Appl. No.: 741,389

[22] Filed: Nov. 12, 1976

[51] Int. Cl.² ............................................. F16K 43/00
[52] U.S. Cl. ..................................... 137/318; 15/345; 134/166 R; 408/68
[58] Field of Search ............. 15/345, 346; 134/166 R, 134/169 R; 137/205.5, 212, 268, 318, 317, 321, 322, 323, 205; 408/68 R; 251/319; 222/148, 400.7

[56] References Cited

U.S. PATENT DOCUMENTS

| 476,312 | 6/1892 | Resche | 408/68 |
|---|---|---|---|
| 733,319 | 7/1903 | Gray | 408/68 |
| 2,484,150 | 10/1949 | Brown | 408/68 |
| 2,869,328 | 1/1959 | Gibson et al. | 134/166 R |
| 3,139,100 | 6/1964 | Griparis | 134/169 R |
| 3,161,900 | 12/1964 | Hornschuck et al. | 15/345 |
| 3,348,734 | 10/1967 | Rice et al. | 222/400.7 |
| 3,460,721 | 8/1969 | Hamel et al. | 137/318 |
| 3,464,435 | 9/1969 | Lamp et al. | 137/212 |
| 3,554,217 | 1/1971 | Ehrens | 137/318 |
| 3,822,716 | 7/1974 | Martin et al. | 137/212 |

FOREIGN PATENT DOCUMENTS 1,006,223  9/1965  United Kingdom ..................... 137/317

Primary Examiner—Martin P. Schwadron
Assistant Examiner—G. L. Walton
Attorney, Agent, or Firm—Richard C. Stewart

[57] ABSTRACT

Apparatus for transferring toxic fluid material from a container having a closure means toward another closed location comprising conduit means and a probe member to provide a closed fluid transfer system.

4 Claims, 3 Drawing Figures

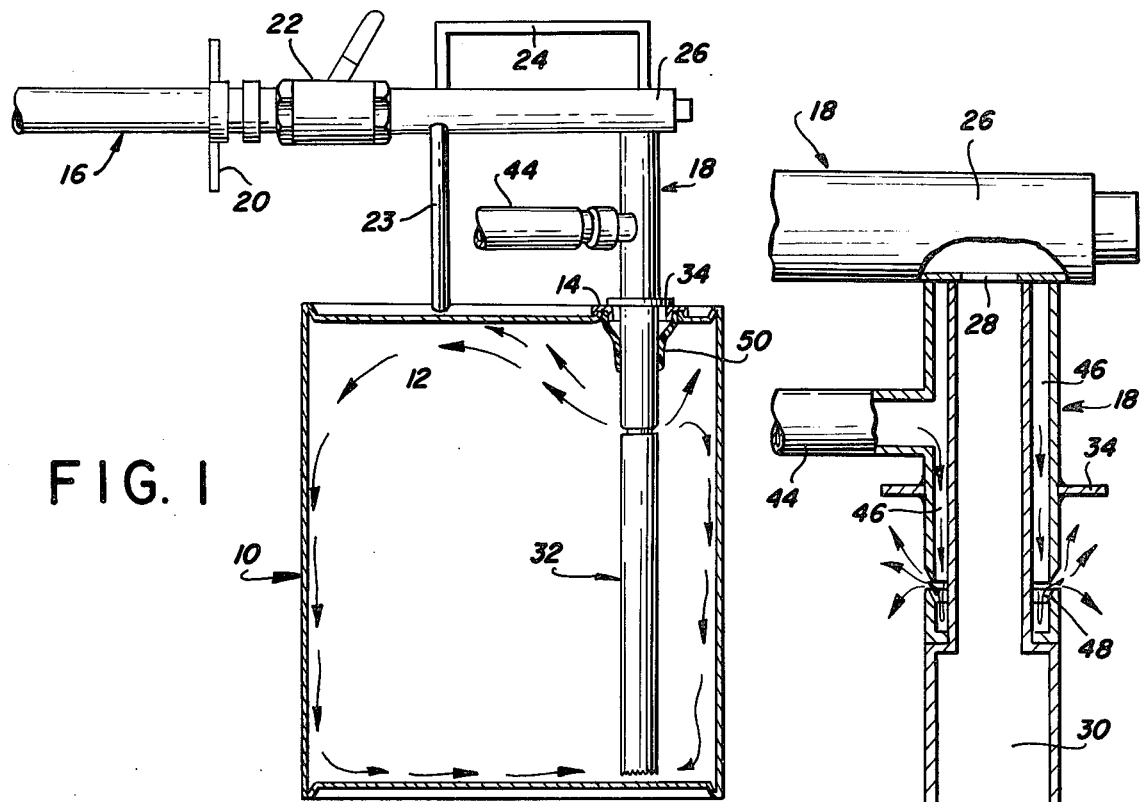
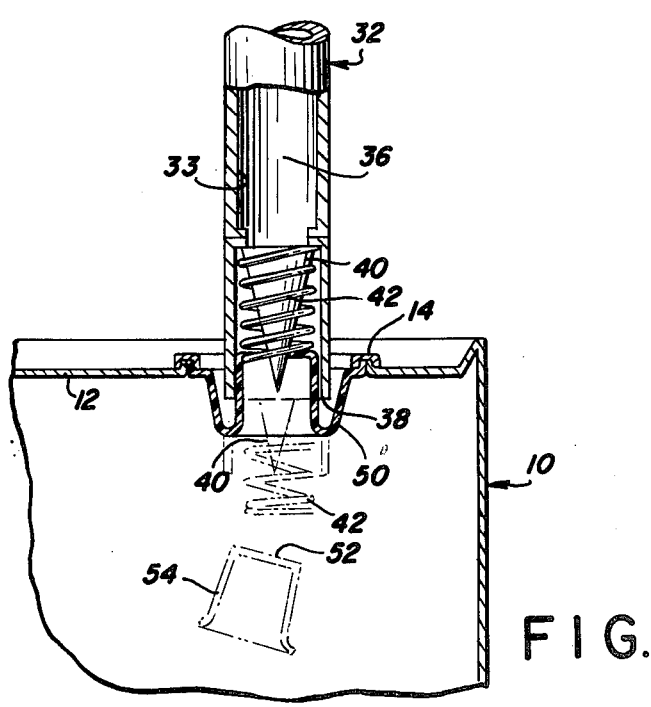
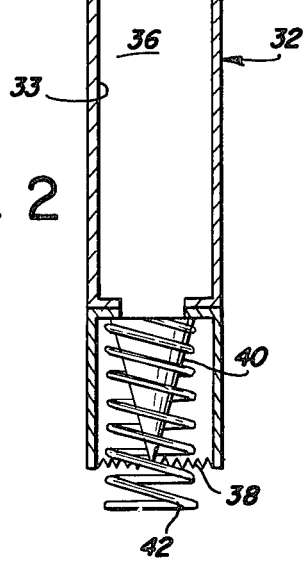
FIG. 1
FIG. 2
FIG. 3

FLUID TRANSFER APPARATUS

The present invention relates to toxic fluid transfer apparatus and, more particularly, to such apparatus employed in the transfer of agricultural chemical fluid materials from a closed container to another closed location.

It has been known that leaks of liquid agricultural chemicals or of the gaseous fumes thereof can be hazardous to the operators of agricultural chemicals spraying and mixing equipment. Such chemicals have been handled for some time under closed container storage, transportation and mixing systems prior to spraying applications in the field. Transfer of such chemicals has usually been effected at moderate vacuum pumping pressure to reduce the danger of leakage of the liquid or its fumes to the atmosphere.

One such system is disclosed in our prior U.S. Pat. No. 3,976,087 entitled "Closed Mixing System for Tending Agricultural Sprayers."

A closed agricultural chemical batching, measuring and mixing system is there disclosed for mounting to a sprayer tending truck. The system includes a measuring tank on which a partial vacuum is drawn by opening a connection to the intake manifold of the internal combustion engine of the truck. The measuring tank is in turn communicated to at least one manifold having numerous valve control inlets, all communicated to discrete agricultural chemical containers which can include highly toxic liquid chemicals. At the inlet remote from the mixing tank, the manifold communicates to a supply of surfactant. Preselected amounts of the liquid chemicals are sequentially drawn by the partial vacuum through the valve controlled manifold and to the measuring tank in which they are accumulated. The surfactant is then drawn through the manifold and into the measuring tank to flush the system. As the chemicals and surfactant are drawn into the measuring tank, the fumes created by the chemicals in the measuring tank are drawn into the intake manifold of the engine and rendered substantially nontoxic. After mixing of the liquid chemicals and surfactant in the measuring tank, the vacuum is broken and the batch is dumped through a dump valve at the bottom of the tank. Simultaneously, a stream of water is discharged from a water storage tank on the tending truck through a conduit to a spray tank on a tractor spraying rig. The measured batch is drawn into the stream of water at less than atmospheric pressure through an induction manifold interposed in the water conduit and diluted by the water. Provision is made to introduce wetable powders into the stream of water in addition to the liquid agricultural chemicals. Thus, a closed mixing system is provided for both liquid and powdered agricultural chemicals.

While such system solves many of the problems inherent in the transfer and mixing of such agricultural chemicals, it does not solve all of them. One such problem revolves around effecting connection of transfer apparatus with shipping containers in regions of high temperature. Most commercial containers employed for the transportation of agricultural chemicals are metal drums having closures which are spouts, bungs and the like. These closures are removed when the drum contents of agricultural chemicals are to be removed. The opening of such closure in any manner, leaving the fluid contents free to the atmosphere, is contrary to operator health regulations in many jurisdictions.

In addition, the health regulations of some jurisdictions require the water washing of the interior of such drums or containers after the agricultural chemicals have been removed before the drums or containers can be destroyed.

Accordingly, it is the object of the present invention to provide apparatus for the safe transfer of such toxic fluid material from a container having closure means toward another closed location, without loss of such toxic material to the atmosphere.

Other aims and advantages of the invention will be apparent from the following description and appended claims.

In the drawing:

FIG. 1 is an elevational schematic view, partially in section, of apparatus of one embodiment of the invention shown in position with respect to a closed container.

FIG. 2 is an elevational sectional view, portions having been broken away, showing the upper and lower regions of a probe member in accordance with the present invention; and FIG. 3 is a fragmentary sectional view of that portion of FIG. 1 near the container cap assembly showing the manner of entry of the probe member into the container and the resulting coaction of elements of the probe member.

In accordance with the present invention, apparatus is provided for transferring toxic fluid material from a container having closure means toward another closed location comprising conduit means and a communicating probe member having: an outer hollow sleeve member terminating at the non-communicating end thereof in rotary cutting means; closure puncturing bayonet and spring ejection means secured within said probe means near said end thereof; and wash water spray port means positioned around the exterior of said probe member above said cutting, puncturing and spring ejection means.

In the preferred embodiment of apparatus of the invention, the container closure puncturing means is positioned so as to first effect puncturing of the closure means. This action will permit any released fumes of the agricultural chemicals filling the container to first be drawn off by the vacuum pressure maintained in the probe member and communicating conduit means toward the other closed location of the system to which the agricultural chemicals contents of the container is to be fed.

Similarly, in the preferred embodiment, the rotary cutting means and spring-loaded ejection means are relatively positioned so as to simultaneously coact to effect cutting of the closure means and ejection thereof into the interior of the container away from the probe member through which liquid agricultural chemicals removal is effected.

It is also preferred in the practice of the invention to employ apparatus having wash water spray ports positioned to discharge upwardly and wash the top interior of the container before being discharged from the container through the probe member.

Referring specifically to the embodiment of the drawing, apparatus is provided for transferring toxic fluid material from a container 10 having a top lid 12 in which closure means 14 are positioned and through which toxic fluid, such as agricultural chemicals, are discharged from container 10. The fluid transfer apparatus comprises transfer conduit means 16 and communicating probe assembly means 18 for transferring the agricultural chemicals from container 10 toward another closed end remotely-positioned location (not shown). The junction between transfer conduit means 16 and probe assembly means 18 is effected by providing disconnect means 20 and valve control means 22 is positioned therebetween to control the flow of material therethrough. The probe assembly means 18 is supported by leg(s) 23 on container 10 as shown in FIG. 1 of the drawing and by handle 24 at the top of probe assembly means 18.

Probe assembly means 18 comprises an upper conduit member 26 which communicates with transfer conduit means 16 through disconnect means 20 and valve means 22. The outlet of upper conduit member 26 communicates through passage 28 with the interior 30 of probe member 32 which constitutes the lower portion of probe assembly means 18 positioned below flange 34. It is this lower portion of the probe assembly means 18 (below flange 34) which projects into the interior of container 10 as probe member 32.

Probe member 32 has an interior axial passage 36 of varying diameter within the outer walls of the probe member 32. Inner walls 33 terminate at the lower portion thereof in rotary cutting means defined by a plurality of circumferentially-arranged cutting teeth 38 positioned around the lower end of probe member 32.

Closure puncturing or bayonet means 40 are secured within the interior of probe member 32 near the lower end thereof and may have any one of a wide variety of shapes, such as the triangular- or bayonet-shaped configuration shown in FIGS. 2 and 3 of the drawing.

Spring injection means 42 are similarly secured to the inner walls of probe member 32 in the region of puncturing means 40 and preferably surround puncturing means 40 and project below cutting teeth 38 and the lower end of probe member 32.

Wash water inlet conduit means 44 provide the flow of wash water to the probe member through annular conduit 46 and through wash water discharge port means 48, annular conduit 46 being positioned within the outer probe assembly means 18 in the manner shown specifically in FIG. 2 of the drawing. The wash water discharge port means 48 may comprise either a single annular discharge port or a plurality of such ports disposed around the outer circumference of the probe member 32. It is preferred that such discharge port means be positioned to direct wash water upwardly and away from the lower end of the probe member 32 as shown in FIG. 1 of the drawing.

In operation, the apparatus of the present invention is employed to transfer fluid agricultural chemicals from a container or drum 10 to another remotely-positioned closed location through the probe assembly means 18 and communicating transfer conduit means 16. Such containers typically employ, mounted in a top port, closures of the type disclosed in U.S. Pat. No. 3,613,966 entitled "Nestable Pouring Spout with Wall-Supporting Cap" which are sold by Rieke Corporation of Auburn, Indiana as "FlexSpout". Such closure has a tamper-proof metallic seal cap, a bail handle closure cap and a nestable pouring spout having a flexible wall with a portion reversible in curvature upon extension of the spout and which is circumferentially supported by a portion of a spout-closing cap when the spout is in nested position. Such a spout 50, with sealed cap and closure cap removed, is shown in FIGS. 1 and 3 of the drawing.

As there shown, probe assembly means 18 is elevated by handle 24 to a position above the closure means 14 and forced in an axially downward direction against the closure means 14 so as to force compression of ejection means 42 and concurrent puncturing of the spout closure means 52 in the manner shown in the solid line portion of FIG. 3 of the drawing.

The puncturing of spout closure 52 permits the release of agricultural chemicals vapors from the container 10 to pass the interior passage 36 of probe member 32 where they are carried by the vacuum maintained on the transfer system toward the other closed location.

Such axial force on probe assembly means 18 is continued, together with rotary movement thereof, to cause cutting teeth 38 to cut through spout 50 leaving spout cut-off portion 54 unsupported, whereupon it is ejected by spring ejection means 42 into the interior of container 10. The spout cut-off permits passage of the entire probe member 32 into container 10 up to the point of contact of flange 34 with the upper projection of closure means 14. This positioning is generally shown in FIG. 1 of the drawing and is attained without any leakage or venting of agricultural chemicals fumes or liquid to the atmosphere, due to the close tolerance between the remaining portion of spout 50 and the outer walls of probe member 32.

As liquid agricultural chemicals are removed by the vacuum system through probe member 32 and upper conduit means 26 and transfer conduit means 16, wash water flow may be begun through inlet conduit means 44, annular conduit 46 and spray port means 48 to begin the internal washing down of container 10. Alternatively, wash water flow may be deferred until the complete transfer of liquid agricultural chemicals from container 10.

It is to be understood that the diameter and length of the probe member of the apparatus of the invention will be dictated by the diameter of the container closure cap and the height of the container, respectively. The length of that portion of the probe member below the supporting flange is preferably set to provide a derived stand-off distance between the lower end of the probe member and the base of the container. Preferably, the positioning of the supporting flange may be made adjustable to permit variation of this stand-off distance for containers of varying heights.

Although the invention has been disclosed and described herein with respect to the preferred embodiment as shown in the drawing, it is, of course, to be understood that departures may be made therefrom within the scope of the invention which is not to be limited to the specific preferred embodiment disclosed and discussed in detail.

What is claimed is:

1. Apparatus for transferring toxic fluid material from a container having closure means toward another closed location comprising conduit means and a communicating probe member having: an outer hollow sleeve member terminating at the non-communicating end thereof in rotary cutting means; closure puncturing and spring ejection means secured within said probe member near said end thereof; said closure, puncturing and spring ejection means are relatively positioned to effect puncturing of said closure means and to force compression of said spring and wash water spray port means positioned around the exterior of said probe member above said cutting, puncturing and spring ejection means to wash the interior of said container.

2. Apparatus in accordance with claim 1, wherein said closure, puncturing and spring ejection means are relatively positioned to simultaneously coact to effect puncturing of said closure means and to force compression of said spring ejection means.

3. Apparatus in accordance with claim 2, wherein said rotary cutting means and spring ejection means are relatively positioned to simultaneously coact to effect removal of said closure means.

4. Apparatus in accordance with claim 1, wherein said spray port means are positioned to direct wash water flow away from said non-communicating end of said probe member.

* * * * *

UNITED STATES PATENT OFFICE
CERTIFICATE OF CORRECTION

Patent No. 4,119,114     Dated October 10, 1978

Inventor(s) Jack Curtis Bolton, Franklin Leroy Alexander

It is certified that error appears in the above-identified patent and that said Letters Patent are hereby corrected as shown below:

Column 4, line 67, which reads "compression of said spring and wash water spray port" should read -- compression of said spring ejection means to eject said closure inside said container and wash water spray port --.

Signed and Sealed this

Sixth Day of February 1979

[SEAL]

Attest:

RUTH C. MASON
Attesting Officer

DONALD W. BANNER
Commissioner of Patents and Trademarks